(12) United States Patent  
Jung et al.

(10) Patent No.: US 9,213,165 B2  
(45) Date of Patent: Dec. 15, 2015

(54) PHOTOGRAPHIC LENS OPTICAL SYSTEM

(75) Inventors: Pil Sun Jung, Seongnam-si (KR);
Hyong Bae Park, Seoul (KR); Chi Ho An, Seongnam-si (KR); Jae Hoon Cho, Seongnam-si (KR); Ji Eun Kim, Seongnam-si (KR)

(73) Assignee: KOLEN CO., LTD. (KR)

( * ) Notice: Subject to any disclaimer, the term of this patent is extended or adjusted under 35 U.S.C. 154(b) by 103 days.

(21) Appl. No.: 13/569,740

(22) Filed: Aug. 8, 2012

(65) Prior Publication Data

US 2014/0043698 A1    Feb. 13, 2014

(51) Int. Cl.
*G02B 13/18* (2006.01)
*G02B 13/00* (2006.01)
*G02B 15/173* (2006.01)

(52) U.S. Cl.
CPC .......... *G02B 13/0035* (2013.01); *G02B 15/173* (2013.01)

(58) Field of Classification Search
CPC ........ G02B 15/173; G02B 15/28; G02B 9/14; G02B 9/30; G02B 9/32; G02B 9/50; G02B 13/0035; G02B 13/18; G02B 13/02; G02B 13/04; G02B 13/0015
USPC .................. 359/687, 690, 713–716, 784–790
See application file for complete search history.

(56) References Cited

U.S. PATENT DOCUMENTS

| | | | | |
|---|---|---|---|---|
| 7,251,083 B2* | 7/2007 | Kubota et al. | ................. | 359/716 |
| 7,468,847 B2* | 12/2008 | Tang | .............................. | 359/785 |
| 7,864,455 B2* | 1/2011 | Kwon | ............................ | 359/785 |
| 2007/0217034 A1* | 9/2007 | Taniyama | ...................... | 359/785 |
| 2008/0225411 A1* | 9/2008 | Kim et al. | ...................... | 359/785 |
| 2010/0321800 A1* | 12/2010 | Kubota et al. | ................. | 359/785 |
| 2011/0249171 A1* | 10/2011 | Shigemitsu et al. | .......... | 348/340 |
| 2011/0249348 A1* | 10/2011 | Kubota et al. | ................. | 359/764 |

FOREIGN PATENT DOCUMENTS

KR        20050059290 A    6/2005
KR         100809252 B1    2/2008

* cited by examiner

*Primary Examiner* — Darryl J Collins
*Assistant Examiner* — Daniele Manikeu
(74) *Attorney, Agent, or Firm* — St. Onge Steward Johnston & Reens LLC (57) ABSTRACT

In a lens optical system having first, second, and third lenses that are arranged between an object and an image sensor where an image of the object is formed, in order from an object side, the first lens has a positive (+) refractive power and is convex toward the object, the second lens has a negative (−) refractive power and is convex toward the image sensor, and the third lens has a positive (+) refractive power and at least one of an incident surface and an exit surface of the third lens has at least one inflection point between a center portion and an edge thereof. The lens optical system satisfies the following inequality that 0.5<f1/f<0.8, in which f1 is a focal length of the first lens and f is a total focal length of the lens optical system.

14 Claims, 6 Drawing Sheets

PHOTOGRAPHIC LENS OPTICAL SYSTEM

FIELD OF THE INVENTION

The present invention relates to an optical apparatus, and more particularly, to a lens optical system adopted in a camera.

BACKGROUND OF THE INVENTION

Cameras using a solid state image sensor such as a charge coupled device (CCD) and a complimentary metal oxide semiconductor (CMOS) image sensor have been rapidly distributed. To increase resolution of a camera, a degree of pixel integration of a solid state image sensor is increased. Also, the size and weight of a camera is being reduced through improvement of performance of a lens optical system included in a camera.

In general, a lens optical system of a compact camera uses a lot of lenses, for example, at least four lens units, to secure performance of the lens optical system. For example, for a lens optical system used for a high pixel camera phone, four lens units are mainly used. When a lens optical system includes many lenses, it may be helpful for aberration correction and viewing angle extension. However, it may be difficult to reduce the size and weight of a lens optical system, that is, the size and weight of a camera, and manufacturing and product costs may be raised. Thus, it is difficult to adopt a large number of lenses only for securing performance.

SUMMARY OF THE INVENTION

The present invention provides a lens optical system that is compact and lightweight and exhibits superior performance.

According to an aspect of the present invention, a lens optical system comprising first, second, and third lenses that are arranged between an object and an image sensor where an image of the object is formed, in order from an object side, wherein the first lens has a positive (+) refractive power and is convex toward the object, the second lens has a negative (−) refractive power and is convex toward the image sensor, and the third lens has a positive (+) refractive power and at least one of an incident surface and an exit surface of the third lens has at least one inflection point between a center portion and an edge thereof, wherein the lens optical system satisfies the following inequality, $$0.5 < f1/f < 0.8,$$

wherein, f1 is a focal length of the first lens and f is a total focal length of the lens optical system.

An Abbe number Vd1 of the first lens and an Abbe number Vd2 of the second lens may satisfy the following inequality, $$29 < Vd1 - Vd2 < 35.$$

The first lens may have a meniscus shape.
The second lens may have a meniscus shape.
At least one of the first and second lenses may be an aspherical lens.
At least one of an incident surface and an exit surface of at least one of the first and second lenses may be an aspherical surface.
Each of the incident surface and the exit surface of the third lens may have at least one inflection point between the center portion and the edge thereof.
The incident surface of the third lens may have one or two inflection points between the center portion and the edge thereof.

The exit surface of the third lens may have one inflection point between the center portion and the edge thereof.
The incident surface of the third lens may be convex toward the object at the center portion and concave toward the object around the edge, and the exit surface of the third lens may be concave toward the image sensor at the center portion and convex toward the image sensor around the edge.
The incident surface of the third lens may be convex toward the object at the center portion, concave toward the object between the center portion and the edge, and then convex toward the object around the edge, and the exit surface of the third lens may be concave toward the image sensor at the center portion and convex toward the image sensor around the edge.
The second and third lenses may be aberration correction lenses.
The lens optical system may further include an aperture between the first and second lenses.
The lens optical system may further include an infrared blocking unit between the object and the image sensor.
The infrared blocking unit may be provided between the third lens and the image sensor.
At least one of the first to third lenses may be a plastic lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 1:
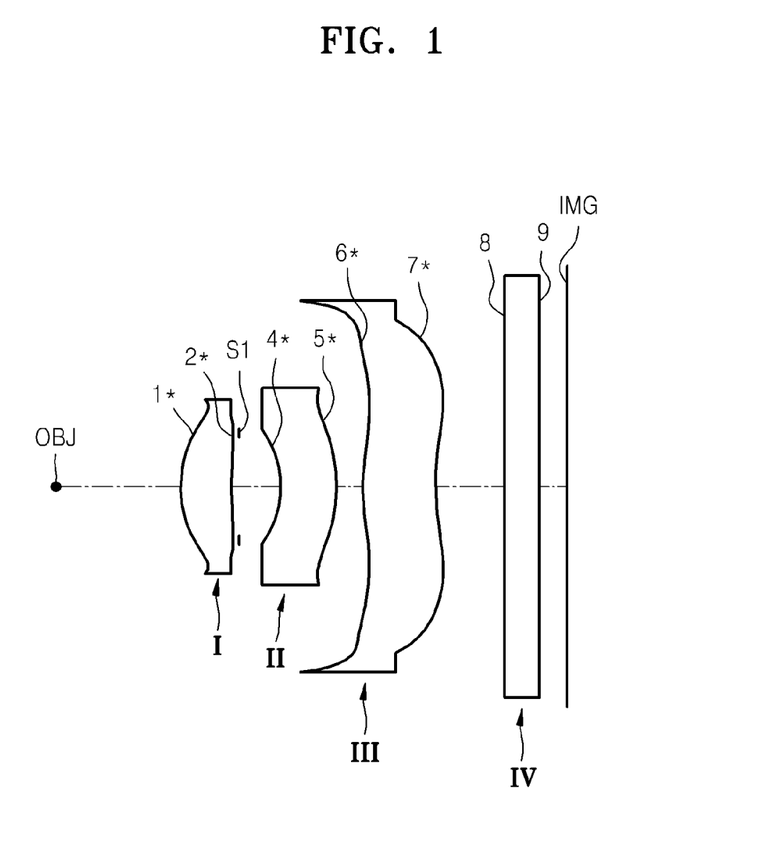
FIG. 1 is a cross-sectional view illustrating an arrangement of main elements of a lens optical system according to a first embodiment of the present invention.
Figure 2:
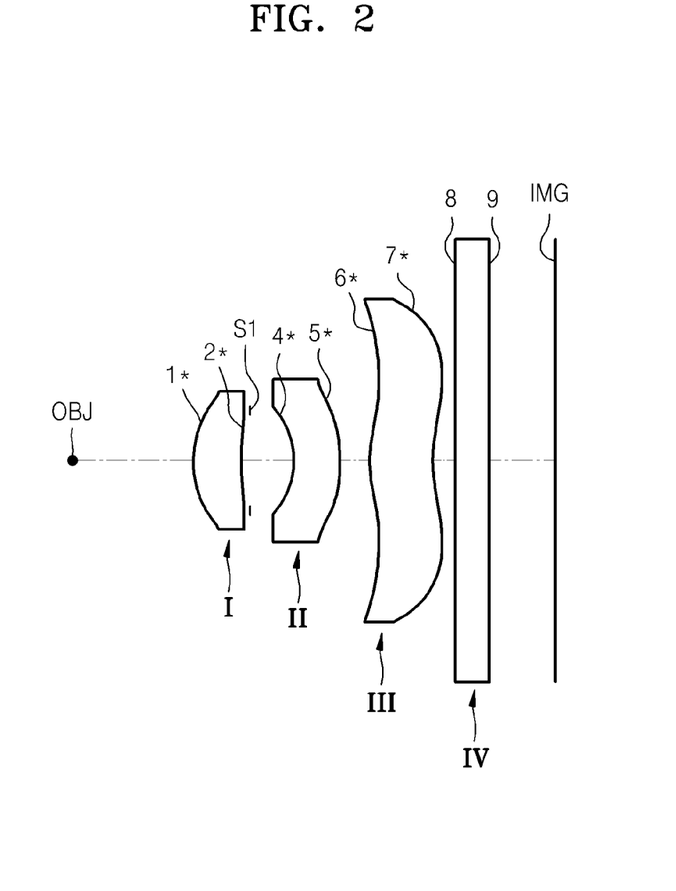
FIG. 2 is a cross-sectional view illustrating an arrangement of main elements of a lens optical system according to a second embodiment of the present invention.
Figure 3:
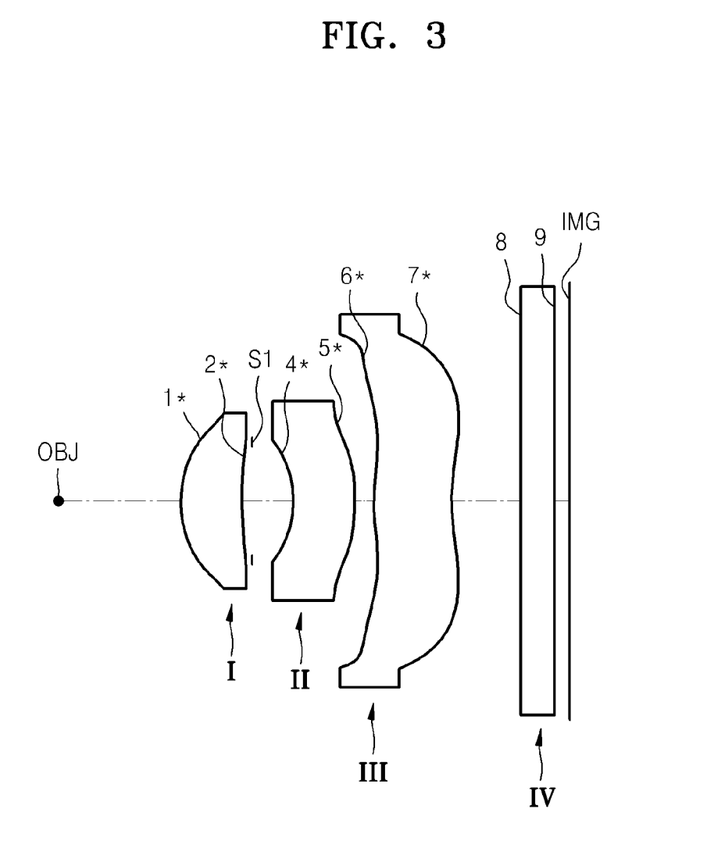
FIG. 3 is a cross-sectional view illustrating an arrangement of main elements of a lens optical system according to a third embodiment of the present invention.

FIGS. 1 through 3 are sectional views illustrating an arrangement of main elements of lens optical systems according to first through third embodiments of the present invention.

Referring to FIGS. 1 through 3, each of the lens optical systems according to embodiments of the present invention may include a first lens I, a second lens II, and a third lens III that are arranged between an object OBJ and an image sensor IMG where an image of the object OBJ is formed, in order from a side of the object OBJ. The first lens I may have a positive (+) refractive power and be convex toward the OBJ. Both of an incident surface 1* and an exit surface 2* of the first lens I may be convex toward the object OBJ. Thus, the first lens I may be a meniscus lens that is convex toward the object OBJ. The second lens II may have a negative (−) refractive power and be convex toward the image sensor IMG. Both of an incident surface 4* and an exit surface 5* of the second lens II may be convex toward the image sensor IMG. Thus, the second lens II may be a meniscus lens that is convex toward the image sensor IMG. At least one of the first and second lenses I and II may be an aspherical lens. In other words, at least one of the incident surface 1* or 4* and the exit surface 2* or 5* of at least one of the first and second lenses I and II may be aspherical. For example, all incident surfaces 1* and 4* and the exit surfaces 2* and 5* of the first and second lenses I and II may be aspherical.

The third lens III may have a positive (+) refractive power and each of an incident surface 6* and an exit surface 7* of the third lens III may be an aspherical surface having at least one inflection point between a center portion and an edge thereof. In detail, the incident surface 6* of the third lens III may have two inflection points between the center portion and the edge as shown in the embodiments of FIGS. 1 and 3, or one inflection point between the center portion and the edge as shown in the embodiment of FIG. 2. The exit surface 7* of the third lens III may have one inflection point between the center portion and the edge as shown in the embodiments of FIGS. 1 through 3. In other words, the incident surface 6* of the third lens III may be convex toward the object OBJ at the center portion, concave toward the object OBJ between the center portion and the edge, and convex toward the object OBJ around the edge (FIGS. 1 and 3). Alternatively, the incident surface 6* may be convex toward the object OBJ at the center portion and concave toward the object OBJ around the edge (FIG. 2). The exit surface 7* of the third lens III may be concave toward the image sensor IMG at the center portion and convex toward the image sensor IMG around the edge (FIGS. 1 through 3). The number of inflection points is counted within an effective area of the third lens III and the shapes of the incident surface 6* and the exit surface 7* may be described with respect to the effective area. The first lens I may have a relatively strong positive (+) refractive power and the second and third lenses II and III may serve as aberration correction lenses.

Each of the lens optical systems may further include an aperture S1 and an infrared blocking unit IV. The aperture S1 may be provided between the first and second lenses I and II. The infrared blocking unit IV may be provided between the third lens III and the image sensor IMG. The infrared blocking unit IV may be an infrared blocking filter. The locations of the aperture S1 and the infrared blocking unit IV are exemplary and may be changed.

The lens optical systems according to embodiments of the present invention configured as above may satisfy at least one of Inequalities 1 and 2.

$$0.5 < f1/f < 0.8$$ [Inequality 1]

Here, "f1" is a focal length of the first lens I and "f" is a total focal length of a lens optical system.

Inequality 1 shows a condition for making a lens optical system compact. Also, Inequality 1 is related to correction of spherical aberration of the lens optical system. When "f1/f" is less than or equal to a lower limit of 0.5 in Inequality 1, although miniaturization of a lens optical system is facilitated, various aberrations such as spherical aberration may be increased. In contrast, when "f1/f" is greater than or equal to an upper limit of 0.8, although correction of spherical aberration is facilitated, the total length of a lens optical system increases and thus miniaturization of a lens optical system may be difficult.

$$29 < Vd1 - Vd2 < 35$$ [Inequality 2]

Here, "Vd1" is an Abbe number of the first lens I and "Vd2" is an Abbe number of the second lens II. The Abbe numbers Vd1 and Vd2 are measured by using a d-line.

In Inequality 2, the Abbe number Vd1 of the first lens I and the Abbe number Vd2 of the second lens II are related to materials of the first and second lenses I and II. Inequality 2 shows conditions for reducing chromatic aberration of a lens optical system. When the conditions of Inequality 2 are satisfied, effects of correcting axial chromatic aberration and chromatic difference of magnification may be obtained.

When the conditions of Inequalities 1 and 2 are met, a relatively short total length may be obtained while various aberrations such as spherical aberration are maintained in a good state. Accordingly, a lens optical system that is compact and has superior performance may be embodied.

In the above embodiments of FIGS. 1 through 3, i.e., the first through third embodiments, the values of Inequalities 1 and 2 are shown in Tables 1 and 2. In Tables 1 and 2, the units of "f1" and "f" are millimeters (mm).

TABLE 1

|  | f1 | f | Inequality 1 (0.5 < f1/f < 0.8) |
|---|---|---|---|
| 1$^{st}$ Embodiment | 2.0822 | 2.7763 | 0.7500 |
| 2$^{nd}$ Embodiment | 2.0681 | 2.6519 | 0.7799 |
| 3$^{rd}$ Embodiment | 2.1121 | 2.8161 | 0.7500 |

TABLE 2

|  | Vd1 | Vd2 | Inequality 2 (29 < Vd1 − Vd2 < 35) |
|---|---|---|---|
| 1$^{st}$ Embodiment | 56.09 | 23.52 | 32.57 |
| 2$^{nd}$ Embodiment | 55.73 | 23.41 | 32.32 |
| 3$^{rd}$ Embodiment | 55.86 | 23.52 | 32.34 |

Referring to Tables 1 and 2, the lens optical systems of the first through third embodiments satisfy Inequalities 1 and 2.

In the lens optical systems according to the above-described embodiments configured as above, the first to third lenses I, II and III may be formed of (or manufactured of) plastic in consideration of the shapes and dimensions thereof. In other words, all of the first to third lenses I, II and III may be plastic lenses. In case of a glass lens, a manufacturing cost is high and conditions for forming are strict, so that it may be difficult to make a compact lens optical system. In the present invention, however, since all of the first to third lenses I, II and III may be formed of plastic, a variety of advantages according thereto may be obtained. Nevertheless, the material of the first to third lenses I, II and III in the invention present is not limited to plastic. If necessary, at least one of the first to third lenses I, II and III may be formed of glass.

The lens optical systems according to the above-described embodiments of the present invention will be described in detail with reference to lens data and the accompanying drawings.

Tables 3 through 5 show curvature radiuses, lens thicknesses or distances between lenses, refractive indexes, and Abbe numbers of lenses constituting the lens optical systems of FIGS. 1 through 3. In Tables 3 through 5, "R" denotes a curvature radius, "D" denotes a lens thickness or a lens interval or a distance between neighboring constituent elements, "Nd" denotes a refractive index of a lens measured by using a d-line, and "Vd" denotes an Abbe number with respect to the d-line. With respect to lens surface numbers of Tables 3 through 5, the mark* denotes that a lens surface is an aspherical surface. The units of R and D values are millimeters (mm).

TABLE 3

| $1^{st}$ Embodiment | Surface | R | D | Nd | Vd |
|---|---|---|---|---|---|
| I | 1* | 0.9605 | 0.4407 | 1.54 | 56.09 |
|   | 2* | 5.1621 | 0.0600 |   |   |
|   | S1 | Infinity | 0.3678 |   |   |
| II | 4* | −0.8732 | 0.4733 | 1.63 | 23.52 |
|   | 5* | −1.6901 | 0.2359 |   |   |
| III | 6* | 1.3828 | 0.6312 | 1.53 | 55.86 |
|   | 7* | 1.7499 | 0.5957 |   |   |
| IV | 8 | Infinity | 0.3000 | 1.52 | 64.12 |
|   | 9 |   | 0.2455 |   |   |
|   | IMG | Infinity |   |   |   |

TABLE 4

| $2^{nd}$ Embodiment | Surface | R | D | Nd | Vd |
|---|---|---|---|---|---|
| I | 1* | 0.8772 | 0.4247 | 1.53 | 55.73 |
|   | 2* | 3.5591 | 0.0500 |   |   |
|   | S1 | Infinity | 0.3925 |   |   |
| II | 4* | −0.8070 | 0.4105 | 1.64 | 23.41 |
|   | 5* | −1.6191 | 0.2653 |   |   |
| III | 6* | 1.0723 | 0.5630 | 1.53 | 55.73 |
|   | 7* | 1.4154 | 0.2000 |   |   |
| IV | 8 | Infinity | 0.3000 | 1.52 | 64.17 |
|   | 9 |   | 0.5900 |   |   |
|   | IMG | Infinity |   |   |   |

TABLE 5

| $3^{rd}$ Embodiment | Surface | R | D | Nd | Vd |
|---|---|---|---|---|---|
| I | 1* | 0.9029 | 0.5300 | 1.53 | 55.86 |
|   | 2* | 3.6025 | 0.0600 |   |   |
|   | S1 | Infinity | 0.3617 |   |   |
| II | 4* | −0.9821 | 0.5327 | 1.64 | 23.52 |
|   | 5* | −1.7861 | 0.1677 |   |   |
| III | 6* | 1.7764 | 0.6720 | 1.53 | 55.86 |
|   | 7* | 1.9241 | 0.5957 |   |   |
| IV | 8 | Infinity | 0.3000 | 1.52 | 64.17 |
|   | 9 |   | 0.1303 |   |   |
|   | IMG | Infinity |   |   |   |

Table 6 shows an aperture ratio Fno and a focal length f of each of the lens optical systems according to the first through third embodiments of the present invention corresponding to FIGS. 1 through 3.

TABLE 6

|   | Aperture Ratio (Fno) | Focal Length (f) [mm] |
|---|---|---|
| $1^{st}$ Embodiment | 2.8 | 2.7763 |
| $2^{nd}$ Embodiment | 2.8 | 2.6519 |
| $3^{rd}$ Embodiment | 2.49 | 2.8161 |

Also, in the lens optical systems according to the first through third embodiments of the present invention, an aspherical surface of each lens satisfies the following aspherical equation, that is, Equation 3.

$$x = \frac{c'y^2}{1+\sqrt{1-(K+1)c'^2y^2}} + Ay^4 + By^6 + Cy^8 + Dy^{10} + Ey^{12}$$ [Equation 3]

In Equation 3, "x" denotes a distance from the apex of a lens in a direction along an optical axis, "y" denotes a distance in a direction perpendicular to the optical axis, "c'" denotes a reciprocal number (=1/r) of a curvature radius at the apex of a lens, "K" denotes a conic constant, and "A", "B", "C", "D", and "E" each denotes an aspherical surface coefficient.

Tables 7 through 9 show aspherical surface coefficients of aspherical surfaces of the lens optical systems according to the first through third embodiments corresponding to FIGS. 1 through 3. In other words, Tables 7 through 9 each show aspherical coefficients of the incident surfaces 1*, 4*, and 6* and the exit surfaces 2*, 5*, and 7* of each lens of Tables 3 through 5.

TABLE 7

| Surface (FIG. 1) | K | A | B | C | D | E |
|---|---|---|---|---|---|---|
| 1* | −0.8274 | 0.1183 | 0.1475 | −1.3058 | 4.7070 | −9.3209 |
| 2* | 12.6038 | −0.0874 | −0.3162 | −1.6010 | 2.5426 | −3.3078 |
| 4* | 0.8345 | −0.0823 | 0.2094 | 2.5170 | 4.0600 | −46.5124 |
| 5* | 0.2461 | −0.6329 | 2.1042 | −3.0294 | 4.0031 | −2.3556 |
| 6* | −13.3451 | −0.4475 | 0.5096 | −0.3035 | 0.0595 | 0.0208 |
| 7* | −3.2341 | −0.3711 | 0.2468 | −0.1230 | 0.0249 | 0.0023 |

TABLE 8

| Surface (FIG. 2) | K | A | B | C | D | E |
|---|---|---|---|---|---|---|
| 1* | −0.9464 | 0.1806 | 0.2025 | −0.8921 | 2.1897 | −2.4048 |
| 2* | 8.3074 | −0.0648 | −0.8152 | 1.8455 | −15.5732 | 33.4184 |
| 4* | 1.4920 | −0.2201 | 0.9374 | 3.4576 | −4.1345 | 60.7483 |
| 5* | −0.1428 | −0.9354 | 2.6879 | −4.8345 | 5.8681 | 2.7380 |
| 6* | −7.3531 | −0.4675 | 0.3753 | −0.1049 | −0.0240 | 0.0185 |
| 7* | −3.9572 | −0.3639 | 0.1991 | −0.0740 | −0.0072 | 0.0174 |

TABLE 9

| Surface (FIG. 3) | K | A | B | C | D | E |
|---|---|---|---|---|---|---|
| 1* | −0.7405 | 0.1217 | 0.4010 | −1.7163 | 5.3596 | −6.2119 |
| 2* | 27.6467 | −0.0631 | −0.0149 | −1.9921 | 1.1120 | 1.0810 |
| 4* | 2.0427 | 0.0577 | −0.1079 | 1.0115 | 14.8041 | −38.8396 |
| 5* | 0.9981 | −0.6015 | 1.8295 | −2.8759 | 3.9390 | −2.2310 |
| 6* | −24.3209 | −0.5161 | 0.5818 | −0.3421 | 0.0640 | 0.0392 |
| 7* | −2.3305 | −0.3478 | 0.1991 | −0.01049 | 0.0244 | 0.0005 |

Figure 4:
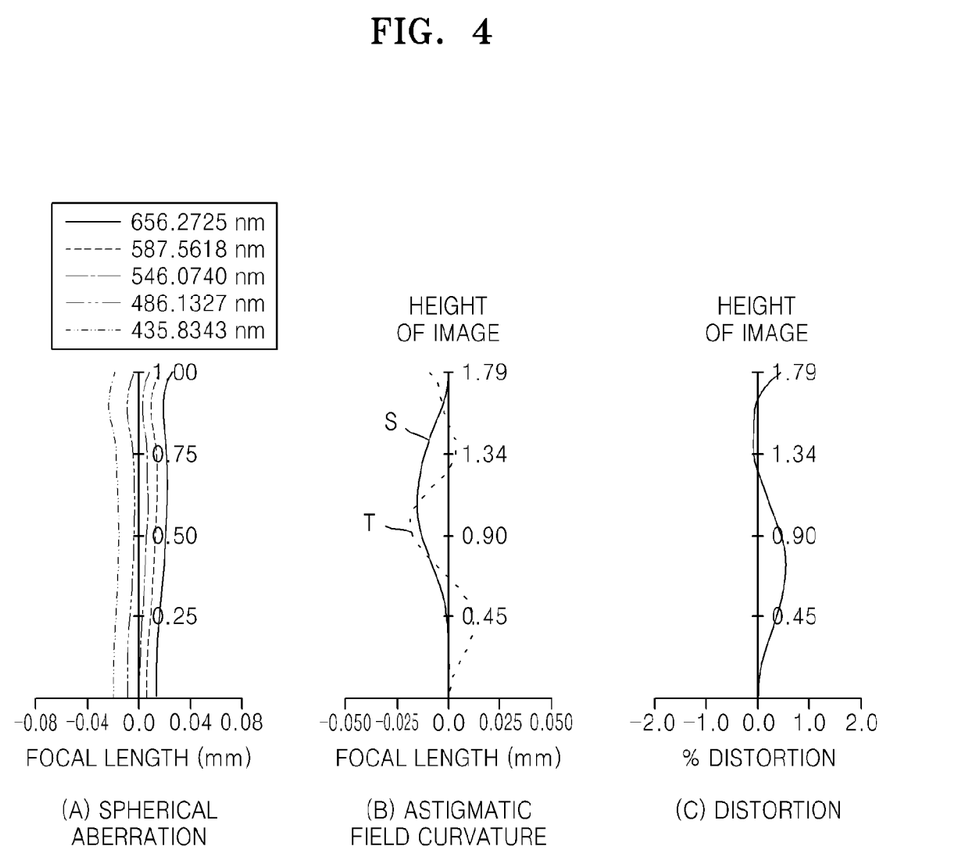
FIGS. 4A, 4B, and 4C are aberration diagrams respectively illustrating longitudinal spherical aberration, astigmatic field curvature, and distortion of the lens optical system of FIG. 1.

FIGS. 4A, 4B, and 4C are aberration diagrams respectively illustrating longitudinal spherical aberration, astigmatic field curvature, and distortion of the lens optical system of FIG. 1, that is, the lens optical system having the values of Table 3. FIG. 4A illustrates spherical aberration of the lens optical system with respect to lights of various wavelengths. FIG. 4B illustrates astigmatic field curvature of the lens optical system, that is, a tangential field curvature T and a sagittal field curvature S. The wavelengths of light used to obtain data of FIG. 4A are 435.8343 nm, 486.1327 nm, 546.0740 nm, 587.5618 nm, and 656.2725 nm. The wavelength of light used to obtain data of FIGS. 4B and 4C is 546.0740 nm.

Figure 5:
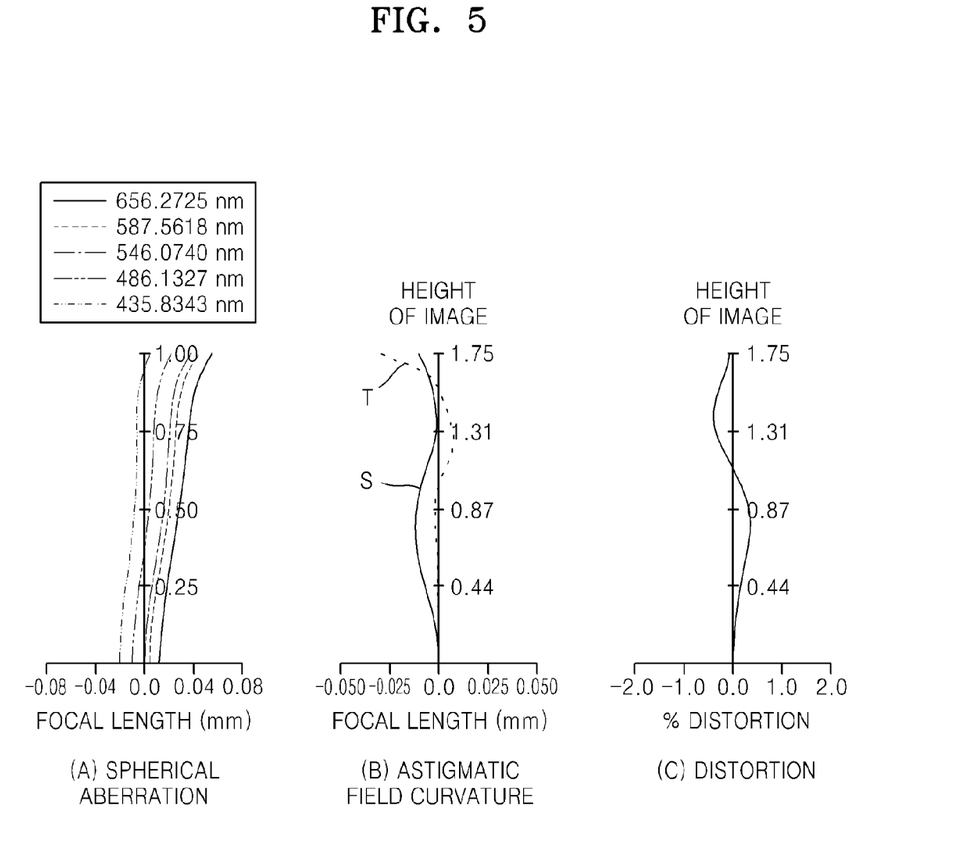
FIGS. 5A, 5B, and 5C are aberration diagrams respectively illustrating longitudinal spherical aberration, astigmatic field curvature, and distortion of the lens optical system of FIG. 2.

FIGS. 5A, 5B, and 5C are aberration diagrams respectively illustrating longitudinal spherical aberration, astigmatic field curvature, and distortion of the lens optical system of FIG. 2, that is, the lens optical system having the values of Table 4. The wavelengths of light used to obtain data of FIG. 5A are 435.8343 nm, 486.1327 nm, 546.0740 nm, 587.5618 nm, and 656.2725 nm. The wavelength of light used to obtain data of FIGS. 5B and 5C is 546.0740 nm.

Figure 6:
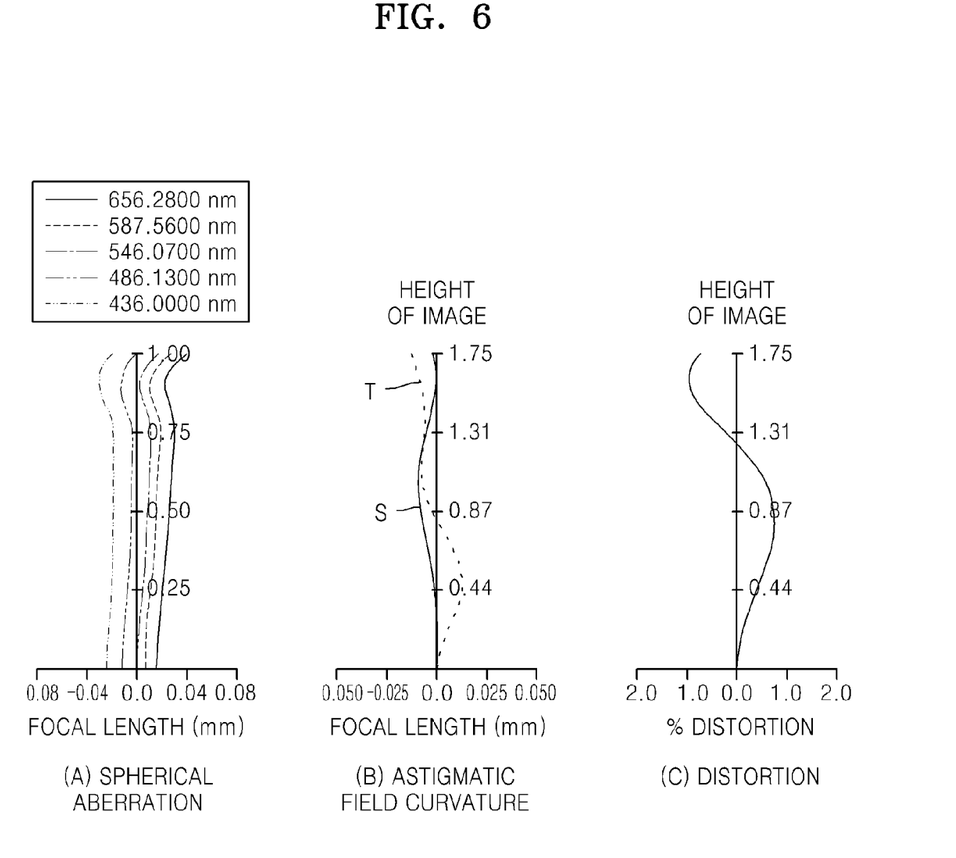
FIGS. 6A, 6B, and 6C are aberration diagrams respectively illustrating longitudinal spherical aberration, astigmatic field curvature, and distortion of the lens optical system of FIG. 3.

FIGS. 6A, 6B, and 6C are aberration diagrams respectively illustrating longitudinal spherical aberration, astigmatic field curvature, and distortion of the lens optical system of FIG. 3, that is, the lens optical system having the values of Table 5. The wavelengths of light used to obtain data of FIG. 6A are 436.0000 nm, 486.1300 nm, 546.0700 nm, 587.5600 nm, and 656.2800 nm. The wavelength of light used to obtain data of FIGS. 6B and 6C is 546.0700 nm.

As described above, the lens optical systems according to embodiments of the present invention each may include the first to third lenses I, II and III respectively having positive (+), negative (−), and positive (+) refractive powers that are arranged in order from the object OBJ side toward the image sensor IMG, and may satisfy at least any one of Inequalities 1 and 2. The lens optical systems may include three units of lenses, may have a relatively short total length, and may easily (well) correct various aberrations. Thus, according to the present invention, a lens optical system that is compact and lightweight and has superior performance and high resolution may be embodied. Also, as described above, since the first to third lenses I, II and III may be formed of plastic and at least one of two surfaces, that is, an incident surface and an exit surface, of each lens may be formed as an aspherical surface, a lens optical system that is compact and has a superior performance may be embodied at low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, it can be seen that those skilled in the art may use a blocking film instead of a filter, as the infrared blocking unit IV. Also, the positions of the infrared blocking unit IV and the aperture S1 may be changed. Therefore, the scope of the invention is defined not by the detailed description of the invention but by the appended claims.

What is claimed is:

1. A lens optical system comprising first, second, and third lenses that are arranged between an object and an image sensor where an image of the object is formed, in order from an object side, wherein the first lens has a positive (+) refractive power and is convex toward the object, the second lens has a negative (−) refractive power and is convex toward the image sensor, and the third lens has a positive (+) refractive power and at least one of an incident surface and an exit surface of the third lens has at least one inflection point between a center portion and an edge thereof, wherein the lens optical system satisfies the following inequalities, $$0.5 < f1/f < 0.8,$$

$$32 < Vd1 - Vd2 < 35,$$

wherein f1 is a focal length of the first lens, f is a total focal length of the lens optical system, Vd1 is an Abbe number of the first lens, and Vd2 is an Abbe number of the second lens, wherein the first lens has a meniscus shape that is convex toward the object, wherein the lens optical system further comprises an aperture between the first and second lenses, wherein an incident surface and an exit surface of the second lens are aspherical, wherein the focal length (f1) of the first lens is smaller than 2.12 mm, and the focal length (f) of the lens optical system is smaller than 2.82 mm, and wherein a curvature radius of the incident surface of the second lens and a curvature radius of the exit surface of the second lens are negative.

2. The lens optical system of claim 1, wherein the second lens has a meniscus shape.

3. The lens optical system of claim 1, wherein the first lens is an aspherical lens.

4. The lens optical system of claim 1, wherein at least one of an incident surface and an exit surface of the first lens is an aspherical surface.

5. The lens optical system of claim 1, wherein each of the incident surface and the exit surface of the third lens has at least one inflection point between the center portion and the edge thereof.

6. The lens optical system of claim 1, wherein the incident surface of the third lens has one or two inflection points between the center portion and the edge thereof.

7. The lens optical system of claim 1, wherein the exit surface of the third lens has one inflection point between the center portion and the edge thereof.

8. The lens optical system of claim 1, wherein the incident surface of the third lens is convex toward the object at the center portion and concave toward the object around the edge, and the exit surface of the third lens is concave toward the image sensor at the center portion and convex toward the image sensor around the edge.

9. The lens optical system of claim 1, wherein the incident surface of the third lens is convex toward the object at the center portion, concave toward the object between the center portion and the edge, and then convex toward the object around the edge, and the exit surface of the third lens is concave toward the image sensor at the center portion and convex toward the image sensor around the edge.

10. The lens optical system of claim 1, wherein the second and third lenses are aberration correction lenses.

11. The lens optical system of claim 1, further comprising an infrared blocking unit between the object and the image sensor.

12. The lens optical system of claim 11, wherein the infrared blocking unit is provided between the third lens and the image sensor.

13. The lens optical system of claim 1, wherein at least one of the first to third lenses is a plastic lens.

14. A lens optical system comprising first, second, and third lenses that are arranged between an object and an image sensor where an image of the object is formed, in order from an object side, wherein the first lens has a positive (+) refractive power and is convex toward the object, the second lens has a negative (−) refractive power and is convex toward the image sensor, and the third lens has a positive (+) refractive power and at least one of an incident surface and an exit surface of the third lens has at least one inflection point between a center portion and an edge thereof, wherein the lens optical system satisfies the following inequalities, $0.5 < f1/f < 0.8,$ $32 < Vd1 - Vd2 < 35,$ wherein f1 is a focal length of the first lens, f is a total focal length of the lens optical system, Vd1 is an Abbe number of the first lens, and Vd2 is an Abbe number of the second lens, wherein the first lens has a meniscus shape that is convex toward the object, wherein the incident surface of the third lens has two inflection points between the center portion and the edge thereof, wherein the lens optical system further comprises an aperture between the first and second lenses, wherein an incident surface and an exit surface of the second lens are aspherical, wherein the focal length (f1) of the first lens is smaller than 2.12 mm, and the focal length (f) of the lens optical system is smaller than 2.82 mm, and wherein a curvature radius of the incident surface of the second lens and a curvature radius of the exit surface of the second lens are negative.

* * * * *